United States Patent
Bashir et al.

(10) Patent No.: US 11,155,676 B2
(45) Date of Patent: Oct. 26, 2021

(54) POLYMER COMPOSITION FOR SELECTIVE SINTERING

(71) Applicant: SABIC Global Technologies B.V., Bergen op Zoom (NL)

(72) Inventors: Zahir Bashir, Riyadh (SA); Hao Gu, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 83 days.

(21) Appl. No.: 16/310,989

(22) PCT Filed: Apr. 6, 2017

(86) PCT No.: PCT/EP2017/058260
§ 371 (c)(1),
(2) Date: Dec. 18, 2018

(87) PCT Pub. No.: WO2017/220228
PCT Pub. Date: Dec. 28, 2017

(65) Prior Publication Data
US 2019/0177473 A1   Jun. 13, 2019

(30) Foreign Application Priority Data

Jun. 20, 2016 (EP) ..................................... 16175291

(51) Int. Cl.
| | |
|---|---|
| *C08G 63/183* | (2006.01) |
| *B33Y 70/00* | (2020.01) |
| *B33Y 10/00* | (2015.01) |
| *B29C 64/153* | (2017.01) |
| *B29C 64/35* | (2017.01) |
| *B33Y 80/00* | (2015.01) |
| *B29K 67/00* | (2006.01) |
| *B29K 509/02* | (2006.01) |
| *B29K 509/10* | (2006.01) |

(52) U.S. Cl.
CPC .......... *C08G 63/183* (2013.01); *B29C 64/153* (2017.08); *B29C 64/35* (2017.08); *B33Y 10/00* (2014.12); *B33Y 70/00* (2014.12); *B29K 2067/003* (2013.01); *B29K 2509/02* (2013.01); *B29K 2509/10* (2013.01); *B33Y 80/00* (2014.12); *C08G 2250/00* (2013.01)

(58) Field of Classification Search
CPC . B29C 64/153; B29C 64/35; B29K 2067/003; B29K 2509/02; B29K 2509/10; B33Y 10/00; B33Y 70/00; B33Y 80/00; C08G 2250/00; C08G 63/183
See application file for complete search history.

(56) References Cited

U.S. PATENT DOCUMENTS

| | | | | |
|---|---|---|---|---|
| 6,110,411 A | * | 8/2000 | Clausen ................. | B33Y 70/00 264/497 |
| 8,834,777 B2 | * | 9/2014 | Simon ................... | B29C 64/153 264/497 |
| 2007/0126159 A1 | | 6/2007 | Simon et al. | |
| 2009/0017220 A1 | * | 1/2009 | Muller .................. | B29C 64/153 427/493 |
| 2013/0177766 A1 | * | 7/2013 | Grebe ................... | B29C 64/182 428/411.1 |
| 2014/0221566 A1 | | 8/2014 | Martinoni | |
| 2015/0251353 A1 | | 9/2015 | Rodgers et al. | |

FOREIGN PATENT DOCUMENTS

| | | |
|---|---|---|
| WO | 9606881 A2 | 3/1996 |
| WO | 2013090174 A1 | 6/2013 |

OTHER PUBLICATIONS

Greiner et al "Selective laser sintering of polymer blends: Bulk properties and process behavior", Polymer Testing 64 (2017) 136-144 (Year: 2017).*
Dadbakhhsh et al "Effect of powder Size . . . "Sep. 2016 (Year: 2016).*
Wegner "New polymer material for the Laser Sintering process . . . ", Sep. 2016 (Year: 2016).*
Tokiwa et al "Biodegradability of Plastics", Int. J. Mol. Sci. 2009, 10, 3722-3742 (Year: 2009).*
Rieckmann et al "Poly(Ethylene Terephthalate) Polymerization—Mechanism, Catalysis, Kinetics, Mass Transfer and Reactor Design", Modern Polyesters , 2003 (Year: 2003).*
Hong et al "Thermal properties and applications of low molecular weight polyhydroxybutyrate", 2013 (Year: 2013).*

(Continued)

*Primary Examiner* — Ling Siu Choi
*Assistant Examiner* — Gennadiy Mesh
(74) *Attorney, Agent, or Firm* — Cantor Colburn LLP

(57) ABSTRACT

A polymer powder composition for production of shaped objects via selective laser sintering includes a thermoplastic material, which is a polyester, wherein the powder has specific particles size distribution. The thermoplastic material has: has a crystallization half time of >30 s and <12 min at a supercooling of 50° C. below the peak melt temperature; a glass transition temperature Tg of >50° C.; a peak melt temperature Tp,m of >200° C.; an extrapolated first heating run melt onset temperature T ei,m of >5° C. above the extrapolated first cooling run crystallization end temperature Tef,c; and a degree of crystallinity of >10.0%. The polymer composition has a continuous use temperature of >100° C., and a low change of molecular weight during exposure to selective laser sintering processing temperatures.

9 Claims, No Drawings

(56) References Cited

OTHER PUBLICATIONS

K. Chrissafis et al "Thermal degradation mechanism of poly(ethylene succinate) and poly(butylene succinate) Comparative study", Thermochimica Acta 435 (2005) 142-150 (Year: 2005).*
Farah et al "Molecular Weight Determination of Polyethylene Terephthalate", 2015 (Year: 2015).*
Leonardo A. Baldenegro-Perez et al "Molecular Weight and Crystallization Temperature Effects on Poly(ethylene terephthalate) (PET) Homopolymers, an Isothermal Crystallization Analysis", 2014 (Year: 2014).*
International Search Report for International Application No. PCT/EP2017/058260; International Filing Date: Apr. 6, 2017; dated Jun. 2, 2017; 6 Pages.
Written Opinion of the International Searching Authority for International Application No. PCT/EP2017/058260; International Filing Date: Apr. 6, 2017; dated Jun. 2, 2017; 4 Pages.

* cited by examiner

POLYMER COMPOSITION FOR SELECTIVE SINTERING

CROSS REFERENCE TO RELATED APPLICATIONS

This application is a 371 of International Application No. PCT/EP2017/058260, filed Apr. 6, 2017, which is incorporated herein by reference in its entirety, and which claims priority to European Application Serial No. 16175291.0, filed Jun. 20, 2016.

The present invention relates to a polymer composition for selective sintering. The invention also relates to a process for producing shaped objects via selective sintering using a polymer composition according to the present invention. The invention further relates to shaped objects produced via selective sintering using a polymer composition according to the present invention.

Selective sintering is an emerging technology that allows for the production of complex three-dimensional objects. At present, one of the main fabrication techniques of such three-dimensional objects is via injection moulding. However, injection moulding involves the use of expensive moulds, as a result of which injection moulding is only an efficient fabrication technique when the amount of objects produced using the mould is sufficiently large. For the production of objects in smaller series, the production costs are too high. For that reason, there is a need for alternative fabrication techniques that avoid the need for using such expensive moulds.

One such alternative fabrication technique is 3D printing. 3D printing is an additive manufacturing method, allowing to fabricate articles without the use of such expensive moulds. Using computer aided design (CAD), a model of the object to be produced is stored. Using this CAD model, a computer may steer a printing device by means of which a material may be shaped into the desired object. 3D printing further may allow for the production of articles of such complex shapes that may not be possible via injection moulding.

The material used for 3D printing may for example be a thermoplastic material. In that case, the printing may be performed by subjecting a predefined portion of a thermoplastic material, for example a powdery thermoplastic material, to a source of irradiation ensuring the particular portion of the thermoplastic material to reach a condition where it fuses to a neighbouring portion of material. Irradiation may be done by exposing the thermoplastic material to electromagnetic radiation such as infrared or near-infrared radiation. Such irradiation may for example be done using radiation having a wavelength of ≥100 nm and ≤100 μm, preferably ≥500 nm and ≤20 μm, more preferably ≥500 nm and ≤10 μm, more preferably ≥700 nm and ≤5 μm. Such processes are known as selective sintering processes.

In such selective sintering processes, the irradiation may for example be done using a multi-wavelength infrared or near-infrared lamp, an infrared or near-infrared curing lamp, infrared or near-infrared light emitting diodes, or a laser source, such as a monochromatic infrared laser source. Such irradiation may for example be done using laser irradiation.

Selective sintering processes may for example include processes where only a selected fraction of the material is subjected to radiation, such as from a moving laser beam. Such process may be referred to as SLS. Alternatively, selective sintering may be achieved by applying a layer of a radiation absorbing material, also referred to as a fusing agent, an example of which is carbon black, wherein the application may for example be performed by jet printing, onto the area of the thermoplastic material that is to be sintered, and subsequently subjecting the surface area of the thermoplastic material, including the area to which the radiation absorbing material is not applied, to an irradiation source. Such selective sintering processes include for example high speed sintering (HSS) processes. In particular, such HSS process may involve use of a detailing agent such as an infrared reflector which may be selectively applied where the fusing action needs to be reduced or amplified. Application of such detailing agent may be done via an ink jet printing process. Advantages are that fusing at the boundary may be reduced, giving an object with sharper and smoother edges.

A further selective sintering process is the Diode Area Melting (DAM) process. Such process allows to increase printing speed since large areas can be molten in parallel using an array of individual laser diodes. These laser beams may be switched on or off as they move across the powder bed. The DAM process may have advantages over SLS in that it may be faster, it may have advantages over HSS in that it may be more energy efficient, as in DAM only the selected area is exposed to radiation. The polymer compositions according to the present invention may be used in all these processes, so including SLS, HSS and DAM.

Selective sintering processes where only a selected fraction of the material is subjected to radiation include for example processes where irradiation may for example be done using laser irradiation. One technique for laser irradiation fusing of a predefined portion of a material such as a thermoplastic material is selective laser sintering (SLS). In SLS, a powder such as a powdery thermoplastic is positioned on a bed, where a laser source irradiates those portions of the powdery thermoplastic on the bed as indicated by the CAD model, in that way melting the thermoplastic material in that area. The molten material may then adhere to the thermoplastic material of a lower positioned layer. This positioned lower layer may be a layer previously formed by the SLS process. In this way, the desired object may be produced layer by layer. The unsintered powder material may be removed, for example dusted off, and may be re-used in a subsequent SLS process. This removal of material may be done when retrieving the object from the build bed.

Objects produced using selective sintering processes such as SLS processes may thus be produced cost-efficiently. However, not every thermoplastic material is suitable for production of objects via SLS. Frequently, problems such as curling of the objects, orange peel, undesirable surface roughness or fuming during the process occur.

For example, when amorphous polymers are used for production of objects via SLS processes, this may result in objects having an insufficient quality. This may be accounted for in that amorphous polymers do not have a sharp melting point, but instead soften over a wide temperature range, and often have a high viscosity. This may result in objects having an undesirably high porosity and rough surface. Furthermore, the individual particles may still be discernible. When a higher intensity of irradiation is used to overcome the high viscosity, this again may lead to charring, or conduction of heat such that material softens in areas that are not desired, as a result of which the shape of the object obtained would not reflect the desired shape to the desired resolution.

Highly crystalline polymers on the other hand tend to melt at a sharp melting point, or in a sharper melting range, absorbing the energy of the source of irradiation to melt crystallites without the being transferred to surrounding areas to an undesirably large degree. However, highly crystalline polymers tend to have such fast crystallisation rate that may result in shrinking and warpage of the objects that are formed. This may be overcome by a very gradual and slow cooling of the material after the irradiation; however, this then leads to an undesirable increase in the time required for the SLS process.

In the SLS processes according to the state of the art, polylaurolactam, also referred to as nylon-12 or PA-12, is commonly used as thermoplastic material. Nylon-12 however has the disadvantage that it has a low melting point of 175° C., which results in a limitation of the continuous use temperature of the shaped objects to below 100° C. For certain applications, the continuous use temperature needs to be higher than 100° C. It is further preferred that the material can withstand a temperature above 200° C. for a short time without losing its desired properties.

There is thus a need for development of a thermoplastic material suitable for selective sintering that may be used in the production of shaped objects requiring a continuous use temperature of ≥100° C. The continuous use temperature may for example in the case of amorphous thermoplastic polymers be defined by the glass transition temperature ($T_g$); alternatively, in the case of crystalline polymers, it may be defined as 30° C. below the peak melting temperature ($T_m$).

A further disadvantage of nylon-12 is that the material is vulnerable to change of properties due to temperature exposure. This leads to a limited ability to re-use the left-over material from the SLS process that has not been subjected to irradiation. The exposure to the powder bed temperatures during SLS leads to a change of the weight average molecular weight $M_w$ of the nylon-12, the change being an increase, which in turn negatively influences several material properties, including the melt viscosity. An increased melt viscosity is undesired as it reduces the ability of the material when in molten form to flow and fill inter-particle spaces during sintering, leading to increase in void formation and rougher surface texture.

Other semi-crystalline materials have too narrow a temperature window for laser sintering.

Another material that has been proposed for SLS is poly(ether ether ketone) (PEEK). However when using PEEK, degradation of the material tends to occur during the SLS process, such that none of the unfused powder particles is suitable for re-use in a further SLS process. As a result of that, a large quantity of the PEEK powder that is supplied to the SLS process does not end up as part of the shaped object that is formed, and has to be discarded as waste. This results in a reuse rate of 0%, meaning that 0% of powder that was previously used in a laser sintering process may again be used in a subsequent laser sintering process. Obviously, in particular since PEEK is an expensive materials, such loss would be undesirable.

Thus, there is a need for a cheaper polymer powder material that can generate semi-crystalline polymer objects through selective sintering, such that the objects can be used at temperatures above 100° C. The powder material should give good printability in terms of dimensional accuracy and shape. Further, such a powder material should have a good re-use rate which means it should have good stability to changes in molecular weight and crystallinity after thermal exposure for long periods.

A class of thermoplastic materials that are known to have a high melting point and a high continuous use temperature are certain thermoplastic polyesters, such as semi-aromatic thermoplastic polyesters. For example, US20140221566A1 described the use of poly(butylene terephthalate) (PBT), a specific type of thermoplastic polyester, in SLS processing. A disadvantage of PBT is its fast crystallisation rate, which may lead to curling of the obtained product and slow build rates.

Thermoplastic polyesters for use in SLS processing are also described in US20070126159A1. However, the polyesters disclosed in this publication, prepared by polycondensation of a di- or polyhydric aliphatic alcohol and an aliphatic dicarboxylic acid, do not have a desired high melting point, and thus do not have a desired continuous use temperature of ≥100° C.

The above thus clearly presents the need to provide a thermoplastic material having a continuous use temperature of ≥100° C., and showing a low change of molecular weight during exposure to SLS powder bed temperatures. Furthermore, it is desirable that the article produced via SLS is crystalline rather than amorphous.

This has now been achieved by a polymer composition comprising a thermoplastic material having:
- a crystallisation half time of ≥30 s and ≤12 min at a supercooling of 50° C. below the peak melt temperature, wherein the crystallisation half time $t_{1/2,c}$ as determined via differential scanning calorimetry in accordance with ISO11357-1 (2009);
- a glass transition temperature $T_g$ of ≥50° C. as determined in accordance with ISO 11357-2 (2013);
- a peak melt temperature $T_{p,m}$ of ≥200° C. as determined in accordance with ISO 11357-3 (2011), first heating run;
- an extrapolated first heating run melt onset temperature $T_{ei,m}$ of ≥5° C. above the extrapolated first cooling run crystallisation end temperature $T_{ef,c}$ as determined in accordance with ISO 11357-1 (2009), first heating and cooling run; and
- a degree of crystallinity of ≥10.0% as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state.

Such polymer composition has a continuous use temperature of ≥100° C., and a low change of molecular weight during exposure to SLS powder bed temperatures. The powder bed temperature is the temperature to which powder that is not subjected to fusing is exposed.

The change of molecular weight may for example be determined via gel permeation chromatography, for example according to ISO 16014-1 (2012), thereby obtaining parameters such as the weight average molecular weight ($M_w$) and the number average molecular weight ($M_n$). Alternatively, the change in molecular weight may be determined by dilute solution viscometry, for example according to ASTM D2857-95 (2007), thereby obtaining the intrinsic viscosity (IV). The change of molecular weight may be expressed as the difference in $M_w$, $M_n$ and/or IV determined on the polymer composition before and after exposure to SLS powder bed temperatures. The change in crystallinity may be determined by comparison of DSC thermograms of material not subjected to the SLS powder bed temperature and of material after being subjected to SLS powder bed temperatures.

The SLS powder processing temperature as used in the context of the present invention may be understood as the temperature to which the irradiated polymer composition is heated. Accordingly, the material in the selected area reaches a temperature above the peak melting temperature, and the material not in the selected area does not reach a temperature above the peak melting temperature. This may for example be greater than the peak melt temperature $T_{p,m}$ as determined according to ISO 11357-1 (2009), for example ≥5° greater than $T_{p,m}$. The SLS powder processing temperature, may for example be ≥5° and ≤100° C. greater than $T_{p,m}$. The SLS powder processing temperature may for example be ≥5° and ≤25° C. greater than $T_{p,m}$.

The DSC curve of the polymer composition preferably is obtained at a rate of heating and cooling of 10° C./min. In a preferred way of determination, the sample is first heated to obtain a melt peak via DSC, wherein with increasing temperature first the melt onset temperature, then the melt peak temperature, and then the melt end temperature according to the definition of ISO 11357-1 (2009) are obtained; during the subsequent cooling, first the crystallisation end temperature, then the crystallisation peak temperature and then the crystallisation onset temperature according to the definition of ISO 11357-1 (2009) are obtained.

The polymer composition of the invention comprises a thermoplastic material having a crystallisation half time of ≥30 s and ≤12 min at a supercooling of 50° C. below the peak melt temperature, wherein the crystallisation half time $t_{1/2,c}$ is determined via differential scanning calorimetry in accordance with ISO 11357-1 (2009). The temperature of supercooling of 50° C. below the peak melt temperature provides a suitable reference as it corresponds to common used powder bed temperature in the SLS process. Preferably, the thermoplastic material has a crystallisation half time of ≥60 s and ≤12 min, more preferably ≥2 min and ≤12 min or ≥4 min and ≤10 min. The crystallisation half time may be understood as a measure for the rate of crystallisation. The use of thermoplastic materials having a faster rate of crystallisation may result in a crystallisation behaviour that has a detrimental effect on the shape accuracy. This may be attributed to rapid shrinkage, which due to temperature gradients could be non-uniform, leading to part distortion.

Further, the thermoplastic material has a glass transition temperature $T_g$ of ≥50° C. as determined in accordance with ISO 11357-2 (2013), preferably ≥60° C., more preferably ≥70° C.

The thermoplastic material has a peak melt temperature $T_{p,m}$ of ≥200° C. as determined in accordance with ISO 11357-3 (2011), first heating run, preferably ≥220° C., more preferably 240° C. Further preferably, the thermoplastic material has a peak melt temperature of ≤300° C., more preferably ≤275° C., even more preferably ≤260° C. For example, the thermoplastic material has a peak melt temperature of ≥200° C. and ≤300° C., preferably ≥220° C. and ≤275° C., more preferably ≥220° C. and ≤260° C. or even ≥240° C. and ≤260° C. The use of a polymer composition having such peak melt temperature is that it allows for the selective laser sintering process to be performed at relatively low processing temperatures, which is beneficial as it brings about a reduced electrical power consumption as well as a reduction of charring of the polymer materials.

The extrapolated first heating run melt onset temperature $T_{ei,m}$ of the thermoplastic materials is ≥5° C. above the extrapolated first cooling run crystallisation end temperature $T_{ef,c}$ as determined in accordance with ISO 11357-1 (2009), first heating run, preferably the extrapolated first heating run melt onset temperature $T_{eo}$, of the thermoplastic materials is 10° C., more preferably ≥15° C. above the extrapolated first cooling run crystallisation end temperature $T_{ef,c}$. An advantage of such interval between the crystallisation peak and the melting peak is that it may allow for a crystallisation in such way that an undesired degree of shrinking of the shaped object is prevented.

The degree of crystallinity of the thermoplastic material as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state;
is ≥10.0%, preferably ≥12.5%, more preferably ≥15.0%.
Alternatively, the degree of crystallinity may be ≥40.0%, or ≥50.0%.

Preferably, the material in the object produced by the selective sintering process has a degree of crystallinity as determined according the to above formula of ≥5%.

It is preferred that the thermoplastic materials has such degree of crystallinity. With objects comprising materials having such degree of crystallinity, the continuous use temperature may be understood to be related to the crystalline melt temperature, where in object comprising amorphous materials the continuous use temperature may be understood to be limited to the glass transition temperature.

It is preferred that the polymer composition is a powder having a mean particle volume size of ≥10 and ≤300 μm as determined in accordance with ISO 9276-2 (2014); more preferably ≥50 and ≤250 μm, or ≥100 and ≤200 μm. Such powder is particularly suitable for processing via SLS sintering, allowing for production of objects having low porosity. It is further preferred that the polymer composition is a powder having a D10 of ≥5 and ≤50 μm, a $D_{50}$ of ≥60 and ≤150 μm, and a $D_{90}$ of ≥160 and ≤300 μm as determined in accordance with ISO 9276-2 (2014); more preferably, the powder has a D10 of ≥10 and ≤40 μm, a $D_{50}$ of ≥75 and ≤100 μm, and a D90 of ≥160 and ≤200 μm. A polymer composition having such particle size distribution is particularly suitable for processing via SLS because it allows for a good flow of materials during the filling of the powder bed, combined with good shape stability of the powder bed. Furthermore, it the particles are too big, the fusion of the material upon exposure to SLS would be insufficient. If particles are too fine, difficulties may occur in the formation of powder layers over the build area may become difficult.

The polymer composition according to the present invention preferably comprises ≥80.0 wt % of the thermoplastic material with regard to the total weight of the polymer composition. Alternatively, the polymer composition according to the present invention comprises ≥90.0 wt %, preferably ≥95.0 wt % of the thermoplastic material with regard to the total weight of the polymer composition.

The polymer composition according to the present invention may for example comprise a thermoplastic material selected from syndiotactic polystyrene, syndiotactic polypropylene, polyphenylene sulphide or polyester. For example, the polymer composition may comprise 80.0 wt %, alternatively ≥90 wt %, alternatively ≥95.0 wt % of a thermoplastic material selected from syndiotactic polystyrene, syndiotactic polypropylene, polyphenylene sulphide or polyester with regard to the total weight of the polymer composition. It is preferred that the thermoplastic material is a polyester. Preferably, the polyester is selected from poly(ethylene terephthalate), poly(ethylene naphthalate), poly(ethylene furanoate), poly(trimethylene terephthalate), poly(ethylene succinate), or poly(hydroxyl butyrate). The polyester may be a homopolymer or a copolymer.

Where a poly(ethylene terephthalate) is used in the polymer composition according to the present invention, it is preferred that the poly(ethylene terephthalate) has an intrinsic viscosity of ≥0.55 dl/g, preferable ≥0.80 dl/g, further preferable ≥1.00 dl/g, more preferable ≥1.10 dl/g. It is also preferred that the polyester has an intrinsic viscosity of ≤2.50 dl/g, further preferable ≤2.00 dl/g, more preferable ≤1.50 dl/g. For example, the polyester may have an intrinsic viscosity of 0.55 dl/g and ≤2.50 dl/g, alternatively ≥0.80 dl/g and ≤1.50 dl/g.

The intrinsic viscosity is determined in accordance with ASTM D2857-95 (2007).

Polyesters having such intrinsic viscosity may show a good combination of melt flow and strength of the sintered object after the laser irradiation, and may result in objects having desirable dimensional accuracy.

Use of a polyester having such intrinsic viscosity, for example an intrinsic viscosity of ≥0.80 dl/g and ≤1.50 dl/g, provides a further benefit in that the quantity of powder that has not been subjected to irradiation by the energy source during the process for production of the shaped objects by selective irradiation is not subjected to changes in their molecular structure as a result of which it would no longer qualify for use as raw material in a subsequent process for shaping a further object by selective irradiation. Thus, such polyester powder that is not fused to a shaped object in the selective irradiation process may again be used in a further shaping process. This allows for an economical use of the powder material, as, depending on the shape to be produced, a significant portion, such as more than 50 wt %, of the powder, will be subjected to heat but will not become part of the produced object. When using conventional materials, such as for example PEEK or Nylon-12, such re-use is limited or not possible at all due to occurrence of degradation effects such as charring and/or viscosity increase as a result of which the fusibility of the material that is being re-used decreases.

Where such polyester is used, the change of the weight average molecular weight ($M_w$) of powder, being the percent difference between the weight average molecular weight of the powder before selective irradiation and the weight average molecular weight of the powder that is not fused after selective irradiation is preferably ≤25%, even more preferable ≤15%, even more preferable ≤10%. Such low Mw change allows for re-use of the unfused powder material. The Mw may be determined in accordance with ISO 16014-1 (2012). Further, by selecting powder with a high degree of crystallinity, for example >50%, the increase of crystallinity upon exposure to heat remains limited.

A particular embodiment of the invention relates to a polymer composition for production of shaped objects via selective laser sintering having a change of Mw of powder before and after selective laser sintering of ≤25%, more preferable ≤15%, even more preferable ≤10%. The Mw after selective laser sintering is to be determined using non-sintered powder.

Particularly preferably, the invention relates to a polymer composition for production of shaped objects via selective laser sintering having a change of Mw of powder before and after selective laser sintering of ≤25%, more preferable ≤15%, even more preferable ≤10%, wherein the polymer composition comprises a polyester selected from poly(ethylene terephthalate), poly(ethylene naphthalate), poly(ethylene furanoate), poly(trimethylene terephthalate), poly(ethylene succinate), or poly(hydroxyl butyrate). Even more particularly preferably, the invention relates to a polymer composition for production of shaped objects via selective laser sintering having a change of Mw of powder before and after selective laser sintering of ≤25%, more preferable ≤15%, even more preferable ≤10%, wherein the polymer composition comprises a polyester being a poly(ethylene terephthalate) having an intrinsic viscosity of ≥0.80 dl/g, and ≤1.50 dl/g, as determined in accordance with ASTM D2857-95 (2007). Using such composition, the crystallinity of the powder does not significantly change despite exposure to high temperature. The first DSC melting peak and the heat of fusion are similar to that of the virgin powder.

Such polymer composition is advantageous in that it can be used as raw material for a further SLS process in quantities of >50 wt % of the raw material used in such further SLS process, or even >70 wt %.

A further advantage of a polymer composition comprising such poly(ethylene terephthalate) is that it allows for the selective laser sintering process to be performed at relatively low processing temperatures, which is beneficial as it brings about a reduced electrical power consumption as well as a reduction of charring of the polymer materials.

The polymer composition according to the present invention may for example comprise a poly(ethylene terephthalate). For example, the polymer composition may comprise ≥80.0 wt %, alternatively ≥90 wt %, alternatively ≥95.0 wt % of a poly(ethylene terephthalate) with regard to the total weight of the polymer composition. The poly(ethylene terephthalate) may be a homopolymer or copolymer. In case the poly(ethylene terephthalate) is a copolymer, the poly(ethylene terephthalate) may for example comprise ≤15.0 wt %, alternatively ≤10.0 wt %, alternatively ≤5.0 wt %, alternatively ≤2.0 wt %, of units derived from a comonomer, with regard to the total weight of the poly(ethylene terephthalate). Preferably, the poly(ethylene terephthalate) comprises ≥0.1 wt % and ≤10.0 wt %, alternatively ≥0.5 wt % and ≤5.0 wt % of units derived from a comonomer, with regard to the total weight of the poly(ethylene terephthalate). The units derived from a comonomer may for example be units derived from an aliphatic diol other than ethanediol, for example cyclohexane dimethanol. The units derived from a comonomer may for example be units derived from an aromatic dicarboxylic acid other than terephthalic acid. For example, the aromatic dicarboxylic acid other than terephthalic acid may be isophthalic acid. It is preferred that where the poly(ethylene terephthalate) is a copolymer, it comprises ≥0.5 wt % and ≤5.0 wt % of units derived from isophthalic acid, with regard to the total weight of the poly(ethylene terephthalate).

In a preferred embodiment of the invention, the poly(ethylene terephthalate) has an intrinsic viscosity of ≥1.00 dl/g and ≤1.50 dl/g.

For example, the polymer composition may comprise a thermoplastic material having:
- a crystallisation half time of ≥30 s and ≤12 min at a supercooling of 50° C. below the peak melt temperature, wherein the crystallisation half time $t_{1/2,c}$ as determined via differential scanning calorimetry in accordance with ISO 11357-1 (2009);
- a glass transition temperature $T_g$ of ≥50° C. as determined in accordance with ISO 11357-2 (2013);
- a peak melt temperature $T_{p,m}$ of ≥200° C. as determined in accordance with ISO 11357-3 (2011), first heating run;
- an extrapolated first heating run melt onset temperature $T_{ei,m}$ of ≥5° C. above the extrapolated first cooling run crystallisation end temperature $T_{ef,c}$ as determined in accordance with ISO 11357-1 (2009), first heating and cooling run; and
- a degree of crystallinity of ≥10.0% as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state
wherein the thermoplastic material is selected from poly (ethylene terephthalate), poly(ethylene naphthalate), poly (ethylene furanoate), or poly(trimethylene terephthalate), and wherein the polymer composition comprises ≥90.0 wt % of the thermoplastic material with regard to the total weight of the polymer composition.

Preferably, the polymer composition comprises ≥90.0 wt % of poly(ethylene terephthalate) having an intrinsic viscosity of ≥0.50 dl/g and ≤1.50 dl/g or ≥1.00 dl/g and ≤1.50 dl/g, and the polymer composition is a powder having a mean average particle volume size of ≥50 μm and ≤200 μm as determined in accordance with ISO 9276-2 (2014).

The polymer composition may in certain embodiments further comprise a flow agent. For example, the polymer composition may comprise ≥0.01 wt % and ≤5.00 wt % with regard to the total weight of the polymer composition of a flow agent. Alternatively, the polymer composition may comprise ≥0.05 and ≤3.00 wt %, alternatively ≥0.10 and ≤1.50 wt, or a flow agent, based on the total weight of the polymer composition. The flow agent may for example be selected from silica, alumina, phosphate, borate, titania, talc, mica, kaolin, attapulgite, calcium silicate, magnesium silicate or a combination thereof. For example, the polymer composition may comprise ≥0.01 wt % and ≤5.00 wt % with regard to the total weight of the polymer composition of a flow agent selected from silica, alumina, phosphate, borate, titania, talc, mica, kaolin, attapulgite, calcium silicate, magnesium silicate or a combination thereof.

In a further embodiment, the present invention also relates to a process for production of shaped objects using the polymer composition according to the invention, wherein the process comprises the steps of:
(a) providing a quantity of a powder comprising the polymer composition;
(b) irradiating a portion of the polymer composition with an irradiation source such that the particles in that portion of the polymer composition absorb sufficient heat to reach a temperature above $T_{p,m}$;
(c) terminating the exposure of the portion of the polymer composition to the irradiation source so that the temperature of the particles of the polymer composition decreases to below $T_{p,m}$; and
(d) removal of the portion of the polymer composition that has not been subjected to irradiation by the energy source;
wherein steps (a) through (d) are executed in this sequence.

In a preferred embodiment,
step (a) comprises placing a quantity of powder comprising the polymer composition in a powder bed comprising a horizontal surface and a frame for holding the powder positioned on the surface;
step (b) comprises irradiating the portion of the polymer composition by a moving irradiation source; and
steps (a), (b) and (c) are repeated in this order to form stacked layers of the polymer composition sintered onto each other prior to execution of step (d).

Particularly, the present invention also relates to a process for production of shaped objects using the polymer composition according to the invention, wherein the process comprises the steps of:
(a) providing a quantity of a powder comprising the polymer composition;
(b) irradiating a portion of the polymer composition with a laser energy beam such that the particles in that portion of the polymer composition absorb sufficient heat to reach a temperature above $T_{p,m}$;
(c) terminating the exposure of the portion of the polymer composition to the irradiation of the laser energy beam so that the temperature of the particles of the polymer composition decreases to below $T_{p,m}$; and
(d) removal of the portion of the polymer composition that has not been subjected to irradiation by the energy source;
wherein steps (a) through (d) are executed in this sequence.

In a preferred embodiment,
step (a) comprises placing a quantity of powder comprising the polymer composition in a powder bed comprising a horizontal surface and a frame for holding the powder positioned on the surface;
step (b) comprises irradiating the portion of the polymer composition by a moving laser energy beam; and
steps (a), (b) and (c) are repeated in this order to form stacked layers of the polymer composition sintered onto each other prior to execution of step (d).

It is preferred that the process is performed in an atmosphere comprising ≤1.0 wt % of oxygen. In particular it is preferred that the process is performed in an atmosphere comprising 1.0 wt % of oxygen and less than 50 ppm of moisture, more preferably less than 10 ppm oxygen and less than 50 ppm of moisture.

The thermoplastic materials in the powder bed that is subjected to irradiation are commonly pre-heated to a temperature such that the irradiation energy and time needed to soften the material is minimized, whilst the material remains in a condition that the powder particles that are not subjected to irradiation do not fuse. If the powder bed temperature is too high, it may lead to fusing of the thermoplastic material in undesired locations, resulting in amongst others dimensional inaccuracy of the shaped object. If the powder bed temperature is too low, the thermoplastic material may insufficiently melt in the desired locations, which may result in amongst others undesired porosity of the shaped object. For example, the powder bed temperature may be kept ≤60° C., more preferable ≤40° C., even more preferable ≥10 and ≤60° C. or ≥20 and ≤40° C., below $T_{p,m}$.

In the process according to the present invention, further additives may be applied that may contribute to the selective sintering process. For example, coalescing agents may be added. Such coalescing agents may for example comprise agents that enhance the absorption of the electromagnetic radiation and the conversion of the absorbed energy into thermal energy, thus contributing to the sintering process.

The present invention also relates to the use of a polymer composition comprising a thermoplastic material having:
- a crystallisation half time of ≥30 s and ≤12 min at a supercooling of 50° C. below the peak melt temperature, wherein the crystallisation half time $t_{1/2,c}$ as determined via differential scanning calorimetry in accordance with ISO11357-1 (2009);
- a glass transition temperature $T_g$ of ≥50° C. as determined in accordance with ISO 11357-2 (2013);
- a peak melt temperature $T_{p,m}$ of ≥200° C. as determined in accordance with ISO 11357-3 (2011), first heating run;
- an extrapolated first heating run melt onset temperature $T_{ei,m}$ of ≥5° C. above the extrapolated first cooling run crystallisation onset temperature $T_{ef,c}$ as determined in accordance with ISO 11357-1 (2009), first heating run; and
- a degree of crystallinity of ≥10.0% as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state
in the production of shaped objects via a process comprising the steps of:
(a) providing a quantity of a powder comprising the polymer composition;
(b) irradiating a portion of the polymer composition with a laser energy beam such that the particles in that portion of the polymer composition absorb sufficient heat to reach a temperature above $T_{p,m}$;
(c) terminating the exposure of the portion of the polymer composition to the irradiation of the laser energy beam so that the temperature of the particles of the polymer composition decreases to below $T_{p,m}$; and
(d) removal of the portion of the polymer composition that has not been subjected to irradiation by the energy source;
wherein steps (a) through (d) are executed in this sequence.

In further embodiments, the invention relates to shaped objects produced via the process according to the present invention, preferably wherein the shaped object has a porosity of ≤5.0%. More preferably, the shaped object has a porosity of ≤4.0%, alternatively ≤3.0%. The porosity may be determined by comparing the density of an article of the same composition and the same crystallinity produced using the material via SLS ($\rho_{SLS}$) with the density of an article produced via injection moulding ($\rho_{IM}$). The porosity (P) in % may for example be calculated as:

$$P = \frac{\rho_{IM} - \rho_{SLS}}{\rho_{IM}} * 100\%$$

In yet another embodiment, the invention relates to a polymer composition for production of shaped objects via selective sintering wherein the polymer composition comprises a thermoplastic material having:
- a crystallisation half time of ≥30 s and ≤12 min at a supercooling of 50° C. below the peak melt temperature, wherein the crystallisation half time $t_{1/2,c}$ as determined via differential scanning calorimetry in accordance with ISO 11357-1 (2009);
- a glass transition temperature $T_g$ of ≥50° C. as determined in accordance with ISO 11357-2 (2013);
- a peak melt temperature $T_{p,m}$ of ≥200° C. and ≤300° C. as determined in accordance with ISO 11357-3 (2011), first heating run;
- an extrapolated first heating run melt onset temperature $T_{ei,m}$ of ≥5° C. above the extrapolated first cooling run crystallisation end temperature $T_{ef,c}$ as determined in accordance with ISO 11357-1 (2009), first heating and cooling run; and
- a degree of crystallinity of ≥10.0% as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state.

In yet a further embodiment, the invention relates to a polymer composition for production of shaped objects via selective sintering wherein the polymer composition comprises a thermoplastic material having:
- a crystallisation half time of ≥30 s and ≤12 min at a supercooling of 50° C. below the peak melt temperature, wherein the crystallisation half time $t_{1/2,c}$ as determined via differential scanning calorimetry in accordance with ISO 11357-1 (2009);
- a glass transition temperature $T_g$ of ≥50° C. as determined in accordance with ISO 11357-2 (2013);
- a peak melt temperature $T_{p,m}$ of ≥200° C. as determined in accordance with ISO 11357-3 (2011), first heating run;
- an extrapolated first heating run melt onset temperature $T_{ei,m}$ of ≥5° C. above the extrapolated first cooling run crystallisation end temperature $T_{ef,c}$ as determined in accordance with ISO 11357-1 (2009), first heating and cooling run; and a degree of crystallinity of ≥10.0% as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state;
wherein the polymer composition comprises a polyester selected from poly(ethylene terephthalate), poly(ethylene naphthalate), poly(ethylene furanoate), poly(trimethylene terephthalate), poly(ethylene succinate), or poly(hydroxyl butyrate).

Preferably, the polymer composition comprises ≥75.0 wt % of the polyester, more preferable ≥90.0 wt % or ≥95.0 wt %, with regard to the total weight of the polymer composition.

Preferably, the polymer composition comprises ≥75.0 wt % of the polyester, more preferable ≥90.0 wt % or ≥95.0 wt %, with regard to the total weight of the polymer composition, wherein the polyester is a poly(ethylene terephthalate).

Even further preferably, the polymer composition comprises ≥75.0 wt % of the polyester, more preferable ≥90.0 wt % or ≥95.0 wt %, with regard to the total weight of the polymer composition, wherein the polyester is a poly(ethylene terephthalate) having an intrinsic viscosity of 0.8 dl/g and 1.5 dl/g.

The invention will now be illustrated by the following non-limiting examples.

TABLE 1

Materials used

| | Example | | | |
|---|---|---|---|---|
| | 1 | 2 (C) | 3 (C) | 4 (C) |
| Material type | PET | PA12 | PC | PBT |
| $D_{10}$ (μm) | 39 | 32 | 40 | 23 |
| $D_{50}$ (μm) | 94 | 51 | 87 | 60 |
| $D_{90}$ (μm) | 188 | 82 | 153 | 123 |
| Mean particle volume size (μm) | 107 | 54 | | |
| Heat of cold crystallisation | None | None | None | None |
| Extrapolated melt onset temperature, first heating run $T_{ei,m}$ (° C.) | 225 | 169 | | 214 |

TABLE 1-continued

Materials used

| | Example | | | |
|---|---|---|---|---|
| | 1 | 2 (C) | 3 (C) | 4 (C) |
| Extrapolated melt end temperature, first heating run $T_{ef,m}$ (° C.) | 263 | 184 | | 238 |
| Peak melt temperature, first heating run $T_{p,m}$ (° C.) | 250 | 175 | | 226 |
| Heat of fusion (J/g) | 60 | 91 | None | 54 |
| Extrapolated crystallisation end temperature, first cooling run $T_{ef,c}$ (° C.) | 218 | 146 | * | 200 |
| Peak crystallisation temperature $T_{p,c}$ (° C.) | 210 | 142 | * | 191 |
| $M_w$ prior to use in SLS (kg/mol) | 124 | | | |
| $M_n$ prior to use in SLS (kg/mol) | 47 | | | |

* The polycarbonate that was used is an amorphous polymer.
PET: Polyethylene terephthalate homopolymer, intrinsic viscosity 1.12 dl/g
PA12: Polylaurolactam, Duraform PA, obtainable from 3D Ssytems
PC: Polycarbonate, Lexan HFD1910, obtainable from SABIC
PBT: Polybutylene terephthalate, Valox 195, obtainable from SABIC Example 1 presents an embodiment of the present invention, example 2-4 are included for comparative purposes.

The above materials were subjected to a selective laser sintering process using a Mini-SLS machine comprising a $CO_2$ laser source. During each laser sintering process, 4 square plates of 30×30×2 mm were produced. To each powder, 0.05 wt % Aerosil 200 flow promoter was added. The materials were pre-dried prior to processing via SLS. The SLS process was conducted in an atmosphere having an oxygen content of ≤1.0 wt %. The SLS process conditions are presented in table 2. The moisture content of the atmosphere was <50 ppm.

TABLE 2

SLS processing conditions

| | Example | | | |
|---|---|---|---|---|
| | 1 | 2 (C) | 3 (C) | 4 (C) |
| Powder bed temperature (° C.) | 225 | 173 | 140 | 213 |
| Piston temperature (° C.) | 185 | 135 | 65 | 170 |
| Cylinder temperature (° C.) | 145 | 110 | 65 | 180 |
| Feed temperature (° C.) | 160 | 120 | 70 | 160 |
| Laser power (W) | 30 | 21 | 21 | 9 |
| Scan speed (m/s) | 4 | 4 | 4 | 4 |
| Hatch distance (μm) | 150 | 150 | 100 | 100 |
| Layer thickness (μm) | 100 | 100 | 100 | 100 |
| Laser scanning time (min) | 20 | | 20 | 20 |
| Cooling time (min) | 60 | 10 | | 60 |

Of the objects produced via that process, material and article properties were determined as presented in table 3.

TABLE 3

Material and article properties.

| | Example | | | |
|---|---|---|---|---|
| | 1 | 2 (C) | 3 (C) | 4 (C) |
| Cold crystallisation temperature (° C.) | 133 | | | |
| Heat of cold crystallisation (J/g) | 4.2 | | | |
| Peak melting temperature (° C.) | 250 | | | |
| Heat of fusion (J/g) | 36.7 | | None | |
| Crystallisation half time, supercooling to $T_{p,m}$-50° C. | 10 min | 30 s | >100 min* | 20 s |
| Degree of crystallinity | 15% | | * | |
| Glass transition temperature $T_g$ midpoint (° C.) | 75 | | | |
| Crack resistance | + | + | | − |

TABLE 3-continued

Material and article properties.

|  | Example | | | |
| --- | --- | --- | --- | --- |
|  | 1 | 2 (C) | 3 (C) | 4 (C) |
| Dimensional accuracy | + | + | − | − |
| Layer delamination | + | + | − | + |
| Porosity | + | + | − |  |
| Continuous use temperature | + | − |  | + |
| Powder re-usability | + | − |  |  |
| Flexural modulus (MPa)** | 2486 | 1140 |  |  |
| Flexural stress (MPa)** | 68 | 67 |  |  |
| Gloss at 60° C., in gloss units** | 15 | 1.9 |  |  |
| $M_w$ of unused (unsintered) powder (kg/mol) | 115 |  |  |  |
| $M_w$ change (%) (decrease) | 7.3 |  |  |  |
| $M_n$ of unused (unsintered) powder (kg/mol) | 47 |  |  |  |
| $M_n$ change (%) | 0 |  |  |  |

* The polycarbonate was an amorphous polymer.
**determined using shaped object

Wherein:

The cold crystallisation temperature, the heat of cold crystallisation, the degree of crystallinity, the glass transition temperature, the peak melting temperature, the heat of fusion and the crystallisation half time were determined in accordance with 11357-1 (2009).

The crack resistance, curling, dimensional accuracy and layer delamination were determined by visual observation.

Layer delamination is the extent to which the SLS shaped object is resistant to delamination of the formed layer. + indicates a good resistance to delamination, − indicates a poor resistance to delamination.

Dimensional accuracy is the extent to which the obtained shape reflects the desired dimensions. + indicates good dimensional accuracy, − indicates poor dimensional accuracy.

Crack resistance is the extent to which cracks such as cracks due to stress related to shrinkage occur. + indicates good crack resistance, − indicates poor crack resistance.

Porosity was determined by comparing density as described above.

Flexural stress and flexural modulus were determined in accordance with ASTM D790-15e2 at 23° C.

Mw and Mn were determined in accordance with ISO 16014-1 (2012).

Continuous use temperature: + indicates a continuous use temperature ≥100° C., − indicates a continuous use temperature <100° C.

The above presented examples show that polymer compositions according to the present invention are particularly suitable for the production of shaped objects via selective sintering.

The DSC curve (first melting) of the SLS printed article of Example 1 showed a $T_g$ at 76° C. (midpoint), a small cold crystallisation endotherm at 133° C. (peak) with heat of 4.2 J/g and a melting endotherm with peak at 250.1° C. and heat of fusion of 36.7 J/g. This confirmed the printed article was crystalline, albeit with a moderate degree of crystallinity. Had the PET article printed from crystalline PET powder been amorphous, the DSC first heating profile of the article would have shown a pronounced $T_g$ at 76 C, a strong cold crystallisation exotherm with typically a heat of 30-35 J/g (instead of 4.2 J/g) and a melting endotherm. Had the PET article been very highly crystalline (as the original PET powder for instance), the DSC curve would have shown a faint $T_g$, no cold crystallisation peak, and only the melting peak (table 1). The as-printed article with moderate crystallinity was annealed at 200° C. for 2 h. This increased the crystallinity of the article without warpage; the DSC now showed a weaker Tg, no cold crystallisation exotherm, and only the melting peak. If crystallisable polymers with crystallisation half times greater than indicated are used, the resulting articles would be amorphous, thus limiting the softening point and/or continuous use temperature. If crystalline polymers with shorter crystallisation half times are used, the article would be crystalline but controlling warping would have been more difficult.

The SLS printed article obtained from example 1 showed desirable dimensional accuracy, having desired sharp corners and edges. No curling or delamination occurred. The surface finish was good. Surface gloss was higher than for PA12. The porosity was 3%, which compares to the porosity of SLS printed objects produced using PA12 (example 2), and which is suitable for the production of the desired articles. The dimensional accuracy was desirable, which may be attributed to the crystallisation half time, allowing the crystalline phase formation to proceed not so fast as to induce rapid shrinkage.

The unused powder obtained from the SLS process in example 1 showed little change of Mw and Mn, indicating that the molecular characteristics of the material were not changed by being subjected to the processing conditions; this indicates that the material can be re-used in a subsequent SLS process, allowing an efficient way of use of the material without extensive waste generation. The samples of example 1 were further subjected to 1H-NMR, which did not show any change of end-group content when comparing powder material before and after SLS.

When using PA12, as is the case in example 2, the material does show a significant change of molecular weight characteristics, as a result of which the material is rendered unsuitable for re-use in SLS. Furthermore, the low melting point results in the articles not being suitable to be used at desirable high use temperatures.

The article produced from polycarbonate in example 3 showed high porosity, which is undesirable for many applications of the produced articles. Further, it was amorphous.

The article produced from PBT in example 4 showed rapid crystallisation, as a result of which the shape stability was poor; undesirable shrinkage occurred, and furthermore the articles were prone to curling and delamination.

A further test was performed using a quantity of powder of example 1 after subjecting to the SLS process. A material composition comprising 70 wt % PET that was not prior subjected to SLS and 30 wt % PET powder that has been prior subjected to SLS was used to produce a shaped object via SLS according to the conditions presented in table 2. The object that was produced had high dimensional accuracy, sharp edged and low surface roughness.

The invention claimed is:

1. A polymer composition for production of shaped objects via selective sintering wherein the polymer composition comprises ≥80.0 wt % of a thermoplastic material with regard to the total weight of the polymer composition, the thermoplastic material having:
   a crystallisation half time of ≥30 s and ≤12 min at a supercooling of 50° C. below the peak melt temperature, wherein the crystallisation half time $t_{1/2,\,c}$ is determined via differential scanning calorimetry in accordance with ISO 11357-1 (2009);
   a glass transition temperature $T_g$ of ≥50° C. as determined in accordance with SO 11357-2 (2013);
   a peak melt temperature $T_{p,m}$ of ≥240° C. and ≤260° C. as determined in accordance with ISO 11357-3 (2011), first heating run;
   an extrapolated first heating run melt onset temperature $T_{ei,m}$ of ≥5° C. above the extrapolated first cooling run crystallisation end temperature $T_{ef,c}$ as determined in accordance with ISO 11357-1 (2009), first heating and cooling run; and
   a degree of crystallinity of ≥10.0% as determined according to the formula:

$$D = \frac{\Delta H_f}{\Delta H_{f,100}} * 100\%$$

wherein:
   D=degree of crystallinity of the thermoplastic material (%);
   $\Delta H_f$=enthalpy of fusion of the thermoplastic material as determined in accordance with ISO 11357-3 (2011);
   $\Delta H_{f,100}$=enthalpy of fusion of the thermoplastic material in a 100% crystalline state,
   wherein the thermoplastic material is a poly(ethylene terephthalate), and
   wherein the polymer composition is a powder having an mean particle volume size of ≥10 μm and ≤300 μm as determined in accordance with ISO 9276-2 (2014); and
   a $D_{10}$ of ≥5 μm and ≤50 μm, a $D_{50}$ of ≥60 μm and ≤150 μm, and a $D_{90}$ of ≥160 μm and ≤300 μm as determined in accordance with ISO 9276-2 (2014).

2. The polymer composition according to claim 1, wherein the thermoplastic material has an intrinsic viscosity of ≥0.55 dl/g and ≤2.50 dl/g as determined in accordance with ASTM D2857-95 (2007).

3. The polymer composition according to claim 1, wherein the polymer composition further comprises ≥0.01 wt % and ≤5.00 wt % with regard to the total weight of the polymer composition of a flow agent selected from silica, alumina, phosphate, borate, titania, talc, mica, kaolin, attapulgite, calcium silicate, magnesium silicate or a combination thereof.

4. The polymer composition of claim 1, wherein the poly(ethylene terephthalate) is a homopolymer.

5. The polymer composition according to claim 1, wherein the crystallisation half time of the thermoplastic material is ≥2 min and ≤12 min.

6. The polymer composition according to claim 1, wherein the crystallisation half time of the thermoplastic material is ≥4 min and ≤10 min.

7. The polymer composition according to claim 1, wherein the polymer composition comprises ≥90 wt % of the thermoplastic material with regard to the total weight of the polymer composition.

8. The polymer composition according to claim 1, wherein the polymer composition comprises ≥95 wt % of the thermoplastic material with regard to the total weight of the polymer composition.

9. The polymer composition according to claim 1, wherein
   the crystallisation half time of the thermoplastic material is ≥2 min and ≤12 min;
   the glass transition temperature $T_g$ of the thermoplastic material is ≥70° C. as determined in accordance with SO 11357-2 (2013);
   the extrapolated first heating run melt onset temperature $T_{ei,m}$ of the thermoplastic material is ≥15° C. above the extrapolated first cooling run crystallisation end temperature $T_{ef,c}$ of the thermoplastic material as determined in accordance with ISO 11357-1 (2009), first heating and cooling run; and
   the degree of crystallinity of the thermoplastic material is ≥15.0%.

* * * * *